Oct. 18, 1960   J. FIORAVANTI   2,956,668
CONVEYOR SYSTEM
Filed July 3, 1958   4 Sheets-Sheet 1
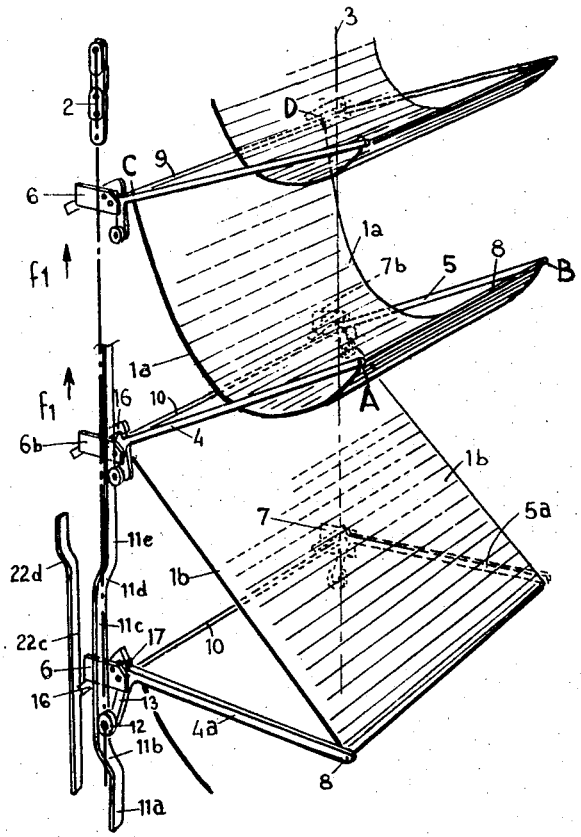
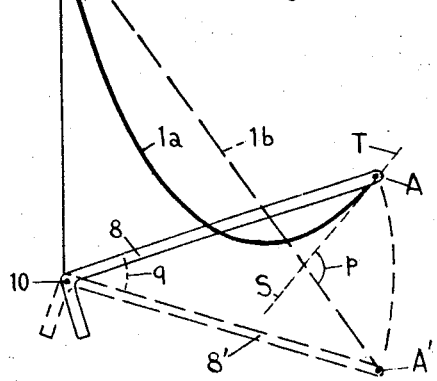
INVENTOR
Jean Fioravanti
By Bailey, Stephens + Huettig
ATTORNEYS Oct. 18, 1960 — J. FIORAVANTI — 2,956,668
CONVEYOR SYSTEM
Filed July 3, 1958 — 4 Sheets-Sheet 2
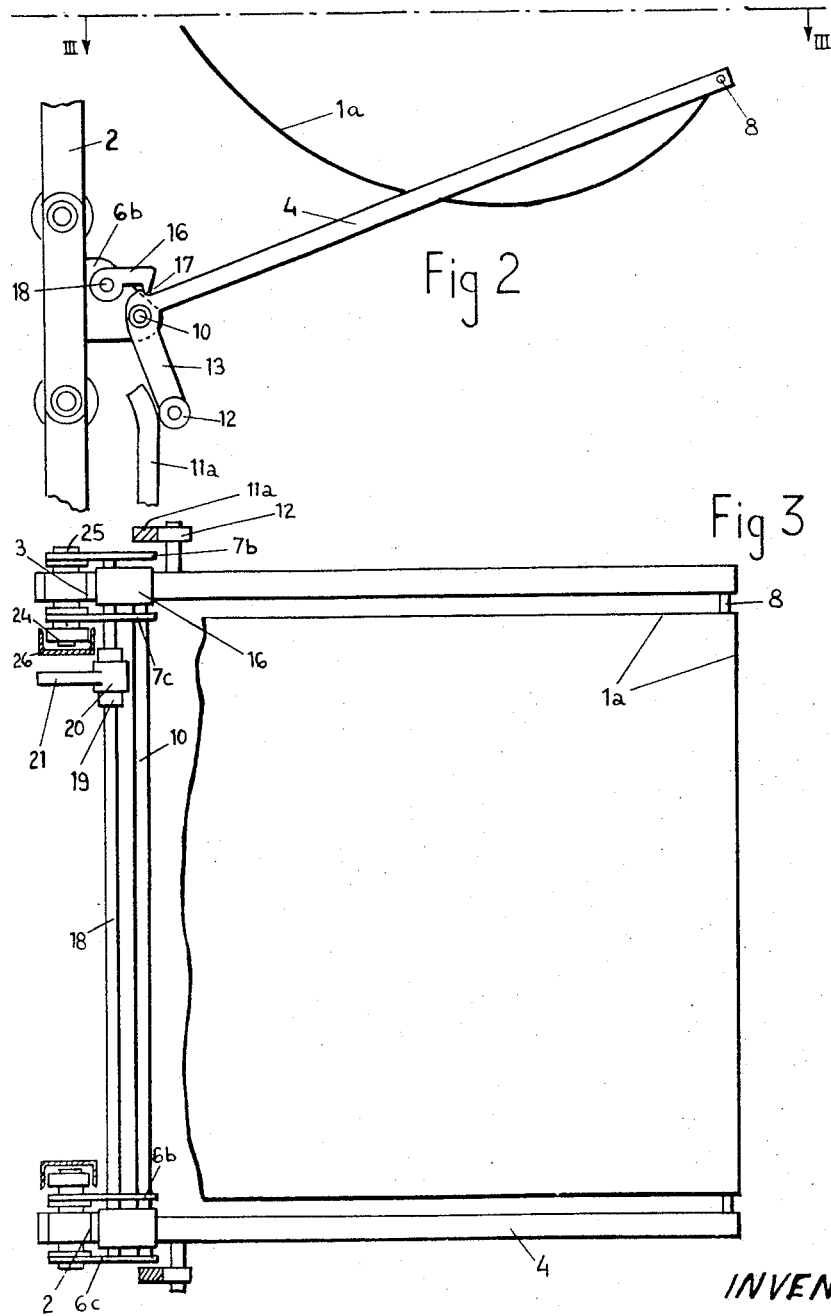
INVENTOR
Jean Fioravanti
BY Bailey, Stephens
ATTORNYS

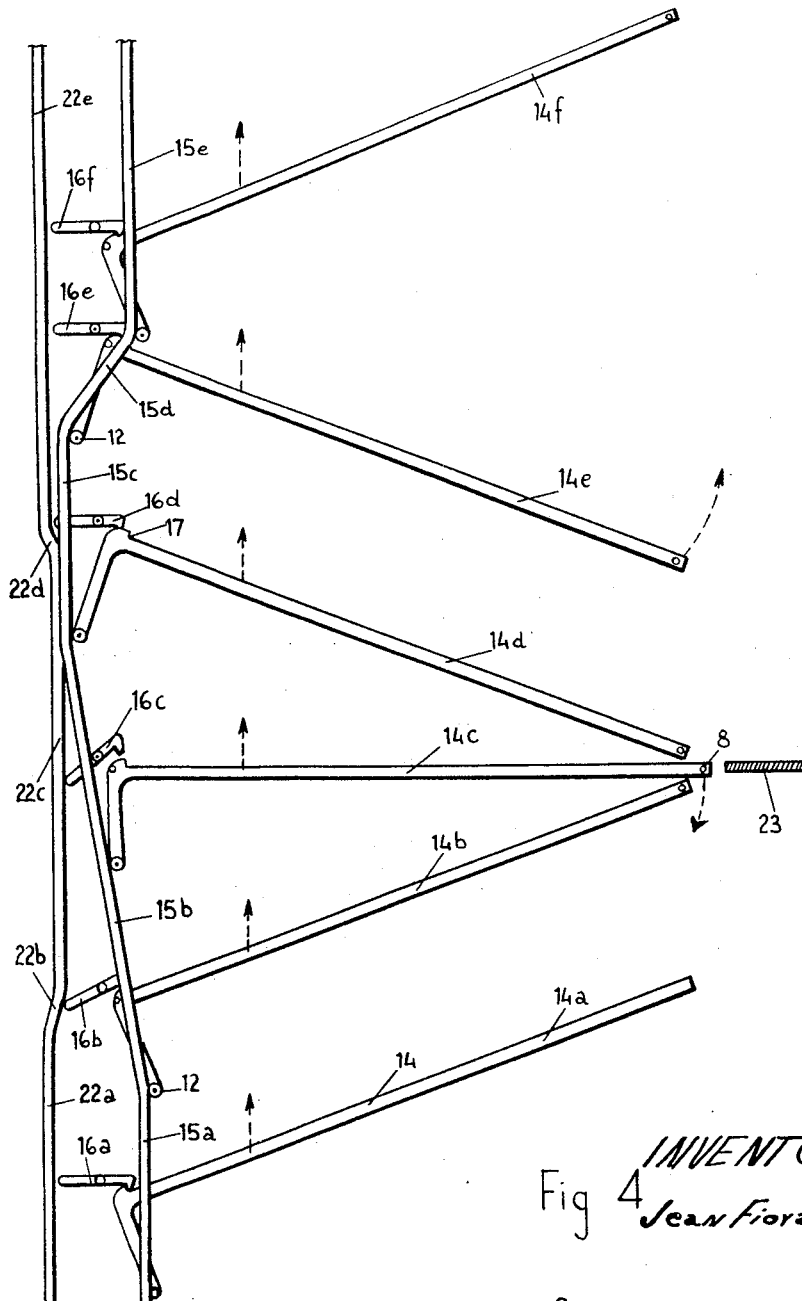

Oct. 18, 1960    J. FIORAVANTI    2,956,668
CONVEYOR SYSTEM
Filed July 3, 1958    4 Sheets-Sheet 4
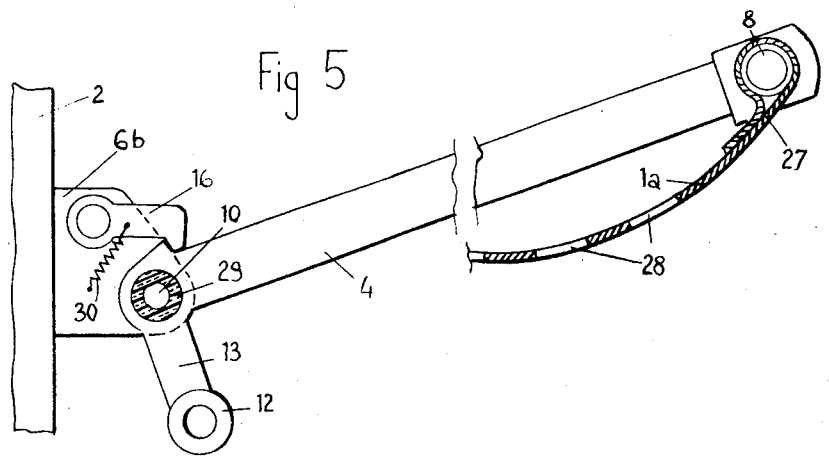
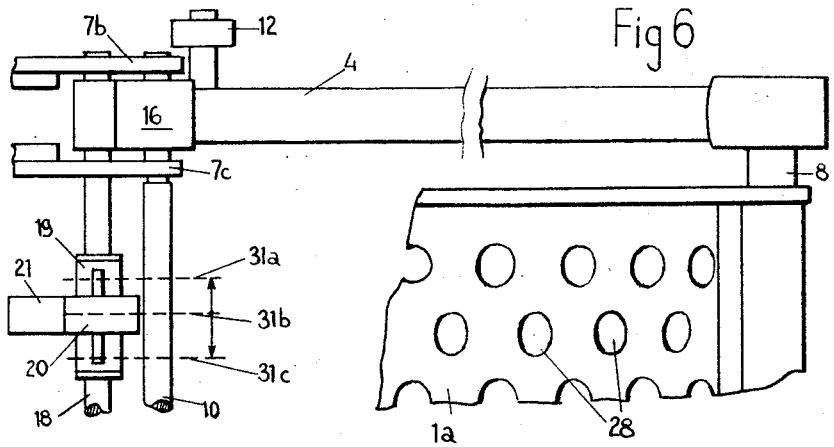
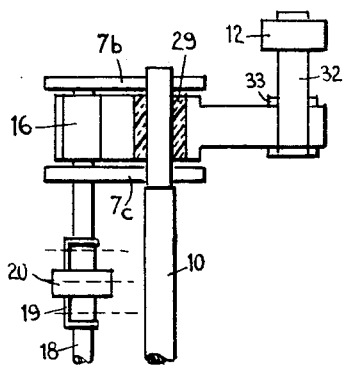
INVENTOR
Jean Fioravanti
By Bailey, Stephens + Keating
ATTORNEYS United States Patent Office 2,956,668
Patented Oct. 18, 1960

2,956,668

CONVEYOR SYSTEM

Jean Fioravanti, 40 Ave. du Parc-Montsouris, Paris 14, France

Filed July 3, 1958, Ser. No. 746,555

Claims priority, application France July 6, 1957

6 Claims. (Cl. 198—153)

This invention relates to conveyor systems of the type using an endless chain or the like with buckets or equivalent carrier elements supported in spaced relation thereon and adapted to be automatically operated for discharging or dumping the articles carried by said elements. An especially advantageous use of the novel conveyor system is as an elevator apparatus, wherein the buckets or other carrier elements are provided with selective dumping means whereby each individual carrier element can be dumped at a selected one of a plurality of dumping levels or stations traversed by the elevator.

It should be understood that the designation "endless chain" should not be interpreted in the narrow sense of a chain proper consisting of interpivoted links, but that it serves to describe any equivalent flexible system which may comprise cables or belt means.

The prior art discloses a variety of conveyor, particularly elevator, systems, using buckets or similar carrier elements supported from endless flexible means and provided with selective automatic dumping control whereby the individual carrier elements may be dumped at a selected one of a plurality of stations or levels. The dumping operation usually involves a rotation of mechanical parts over a considerable angular extent, so that high inertia effects are developed and there is considerable friction and wear of the pivoted parts. Thus, in many instances dumping is effected by opening a pivoted trap-door in the bottom of the carrier element, and such opening necessarily requires a large-amplitude angular rotation of the door. The objectionable inertia effects developed frequently require the provision of complicated counterpoise means which in turn increase the weight and hence the power requirements of the system. Also, in view of the frictional and other stresses high safety factors must be used in designing the structural components, considerably increasing the cost price.

It is a chief object of the invention to provide improved conveyor and/or elevator apparatus of the general type stated, which will satisfy practical requirements more fully than heretofore, especially in regard to the provision of simple, lightweight and inexpensive bucket-like carrier elements, which will be operable for dumping their contents by small-amplitude movement of lightweight parts.

In accordance with the invention, conveyor apparatus of including endless flexible means (e.g. chain means) the specified type is principally characterized in that the carrier elements each comprise a flexible element, e.g. of fabric or other sheet material, providing a supporting surface for the articles or materials to be conveyed, and means supporting said flexible elements from said endless means, which supporting means are operable between two positions in one of which the related flexible carrier element assumes a carrying condition in which said element hangs slack to constitute a pocket in which the contents is stably supported, and in the other of which positions said flexible carrier element assumes a dumping condition, as by being stretched more or less taut take up the slack therein and eliminate the pocket thereby discharging the contents.

The supporting means may comprise at least one supporting arm pivoted relative to the endless chain means and rotatable under the control of a camway extending alongside said chain means, rotation of said arm acting to modify the spacing between two points of support of the flexible carrier element, so as to cause said element to assume either relative slack condition in which the element defines a pocket for carrying its contents or a relatively taut condition in which the element discharges its contents.

In accordance with further structural features of the invention:

The flexible carrier element is supported at at least three, and preferably four points. Two of the four points may each be carried by a separate supporting arm, both of which arms may be rotatable relative to a further pair of supporting means carrying the remaining two points of support of the element;

The flexible carrier elements are made of fabric or the like;

The points of support of the flexible element, four in number, are rigidly interconnected in pairs by means of rods or the like, and the flexible element itself may be bonded at one or more intermediate points to each such rod;

Some or all of the carrier elements are provided with latching means whereby the rotatable supporting arms may be blocked in a condition preventing rotation thereof to the dumping condition;

Selective means are provided for causing the latching means to be released as the related carrier element moves past a selected one of a plurality of latching control stations traversed by the apparatus.

The above and further objects, features and advantages of the invention will become clearer as the description proceeds, with reference to the accompanying drawings, wherein Fig. 1 is a general diagrammatic illustration, partly in perspective and part in elevation, showing a fragment of elevator apparatus according to the invention;

Fig. 2 is a larger-scale view, and

Fig. 3 is a corresponding plan view on line III—III of Fig. 2;

Fig. 4 is a schematic view showing five consecutive positions of a pivoted supporting arm of a carrier element as assumed during a full cycle of dumping movement.

Figs. 5 to 7 are detail views on an enlarged scale; and

Fig. 8 is a geometric diagram illustrating the dumping operation of a carrier element in the apparatus of the invention.

The drawings, as well as the related descriptive matter, are given for purely illustrative purposes and should not be interpreted as defining the scope of the invention.

A carrier element in conveyor apparatus according to the invention, as shown for example in Fig. 1, comprises a flexible element of fabric or the like, of generally rectangular shape when extended flat. In Fig. 1 such an element is shown at 1a at the top of the drawing in the condition assumed by it when the carrier element of which it forms part is in carrying condition, and at 1b in the condition assumed when the carrier element is in dumping position.

In the illustrated embodiment, each flexible element constituting a carrier element is supported at four points, i.e. at the four corners A, B, C, D of the rectangular flexible element through supporting means to be presently described, from the endless flexible means provided in the form of two spaced parallel chains 2 and 3, which are displaced in synchronism together in the direction shown by arrow f1.

The supporting means comprise arms 4, 5, 6 and 7. The arms 4 and 5 pivoted to the lower corners A and B of the flexible element are pivoted at their other ends to the chains 2 and 3, whereas the upper two supports or brackets 6 and 7 to which the upper corners C and D are fastened, are fixed to the respective chains. The movable arms 4 and 5 are pivoted to brackets 6b and 7b fixed to the respective chains and generally similar to the brackets 6 and 7. In one practical constructional form shown in Fig. 3, each bracket is actually provided in two symmetrical parts 6b—6c and 7b—7c secured to opposite sides of each related chain for improved balance.

Preferably, the bottom and upper end of each flexible element rather than being supported only at its corners A—B or C—D from the related arms, is supported also at intermediate points by the provision of the pair of rods 8 and 9, rod 8 extending across the movable outer ends of the supporting arms 4 and 5, and rod 9 across the upper brackets 6 and 7. Such an arrangement improves the suspension of the fabric element and reduces wear and tear.

Similarly, the supporting arms 4 and 5 and related rod 8 are preferably supplemented by a rear rod 10 extending across the pivot points of arms 4 and 5 with the respective brackets; this contributes to the desired uniform spacing between chains 2 and 3 and the synchronous motion thereof.

The rotational movements of arms 4 and 5 about their pivots are controlled at least in part by the provision of camways 11 (comprising the sections 11a, 11b, 11c, 11d and 11e, Fig. 1). Pivotal arm 4a rides in engagement with such a camway through the intermediacy of a follower roller 12 journalled on an appendage 13 projecting from the rear end of the arm and the weight of the arm 4a tends to apply the follower roller into engagement with its camway. With the camway 11 having the configuration shown in Fig. 1, it will be seen that so long as the arm is free to rotate about its pivot within predetermined limits, the resulting operation during upward movement of the conveyor chains will be as follows. While the roller 12 is riding over the section 11a of the camway, element 1b is held in carrying condition (the condition shown for element 1a at the top of the drawing). Then as roller 12 engages camway section 11b, arm 4a will begin to pivot downwardly about the pivot 10, until it has reached an end position wherein flexible element 1b is substantially stretched tight as shown in Fig. 1. The arm retains this position while roller 12 is riding on section 11c, or is positioned near the said section in case the downward rotational movement of arm 4a is arrested by the stretching of the element 1a before roller 12 has engaged camway section 11c, as may well be the case. As the roller 12 engages camway section 11d, arm 4a is rotated upwards or counterclockwise until it is restored to its carrying position where it is parallel to the position shown for arm 4 in Fig. 1.

The above is clearly illustrated by the diagrammatic showing of Fig. 4 in which six consecutive positions of a supporting arm 14 similar to arm 4 are shown, though it is to be noted that in Fig. 4 the camway 15 shown differs somewhat in contour from that of the camway 11 in Fig. 1 for a purpose to be later explained. Also, the endless chain means have not been illustrated in Fig. 4.

The system as so far described permits the dumping of the contents of each carrier element at a single station along the path of travel of the chains 2—3. However, it is in many cases desirable to be able to dump each individual carrier element at a selected one of a plurality of dumping stations. Such a possibility is especially valuable for example where the elevator is installed in a warehouse, store, or in post office sorting installations. Further, in installations of this character, more than one loading station or level may have to be provided, and it is desirable that means be provided at each loading station or level for pre-selecting the particular unloading station or level at which each individual loaded carrier element will be dumped. The invention accordingly provides improved means whereby such operations can be simply and efficiently carried out.

For this purpose the pivotal supporting arms such as 4 and 4a are provided with latching means which are normally operative to prevent rotation of the supporting arms away from their carrying position by the camway, and thereby prevent the dumping of the related carrier element. Selector means are moreover associated with each carrier element whereby the related latching means can be temporarily disabled, to permit dumping of the element at a selected station.

Each latching device herein is provided by pawl 16 which cooperates with a catch 17 carried by each pivotal supporting arm 4—4a or 5. Both pawls 16 relating to the respective supporting arms of a carrier element are interconnected for bodily rotation together by means of a shaft 18 (Fig. 3) rotatably mounted in the brackets 6b, 6c, 7b, 7c. The shaft 18 further carries a sleeve 19 slidably settable along it, upon which a member 20 is secured having a projection or lever 21 extending normally to the shaft 18 so that depression of the lever 21 will rotate the shaft and disengage the catch 17 from the related pawl.

At each unloading station or level actuator means are provided presently described in detail, for actuating the projections 20 of a carrier element as said element moves past the station. In the respective stations the said actuator means are positioned at points displaced transversely of the direction of movement, i.e. transversely across the chains 2—3. Thus it will be understood that by presetting the slider member 20—21 at a predetermined position along the shaft 18 of each particular carrier element, it will be possible to cause that carrier element to be dumped at a selected station. The presetting action can be effected at any point of the conveyor system, including of course the loading station.

The actuating means provided at the various stations for selectively depressing the lever 21 are herein provided in the form of further camways separate from the camway 11 controlling the pivotal movement of the arms such as 4. Such a further camway is illustrated clearly in Fig. 4 at 22 as including the sections 22a to 22e, and partly in Fig. 1.

Referring again to Fig. 4, a single pivotal supporting arm 14 is there shown in six positions consecutively assumed thereby as at 14a, 14b, 14c, 14d, 14e and 14f, and the corresponding positions of the related latching pawl 16 are shown at 16a, 16b, 16c, 16d, 16e, and 16f.

In position 14a the arm 14 latched by the pawl in position 16a. The pawl in position 16b has engaged the section 22b of the release camway and releases the arm 14. According to a preferred arrangement, at the time the arm 14 is thus released the follower roller 12 of the arm is preferably still positioned on the section 15a of the main camway 15 so that the arm has not yet commenced its pivotal movement. The section 15b of the main camway only starts at that point of the travel of roller 12 where the outer end of the carrier element (adjacent rod 8) is substantially flush with the dumping level herein constituted by a horizontal platform 23. Moreover, the contour of the camway section 15b is so predetermined that, throughout the entire clockwise pivotal movement of the arm through the positions 14b—14c—14d the outer end of the carrier element remains substantially stationary in space, in alignment with the unloading platform 23. It will be understood that this arrangement greatly enhances the smoothness of the dumping action.

Thereafter the control camway is so contoured that the supporting arm 14 retains its downwardly inclined condition for a short period of time as it now bodily moves upward with the endless chains and its outer end rises above the platform 23, thereby to complete the dumping action if necessary, and thus reaches the position shown at 14e. Meantime the latching pawl 16 has moved past the section 22a of the control camway and assumed its latching position again at 16d so that it is in condition to resume its latching engagement with the catch 17 as soon at the arm 14 has been brought to a suitable raised position. The upward rotational movement of the arm 14 begins as the roller 12 reaches the camway section 15d, so that the arm is finally restored to its fully raised position at 14f where its catch 17 is reengaged by the latching pawl. Thus the now empty carrier element has been returned to its carrying condition.

It will be appreciated that despite the great simplicity of the movement controlling means provided, the requisite motions are performed with high accuracy and flexibility, and that the automatic selective dumping of the carrier elements of the improved conveyor or elevator are obtained in an efficient and fully reliable manner.

The invention further includes a number of detailed features or improvements which will now be described. One such improvement has the object of increasing the number of carrier elements that can be provided. For this purpose it is contemplated that the same brackets such as 6 (Fig. 1) serve simultaneously for pivotally supporting the lower cross rods 10 on which the rotatable arms 4 of one carrier element are secured, and for supporting the upper cross rods such as 9 on which the upper end of the next lower flexible carrier element is fastened.

Another improvement sets out to minimize the reaction forces which would otherwise tend to displace the brackets such as 6 or 7 in an oblique direction on relative downward movement of the rotatable arms 4 or 5 of a carrier element. For this purpose as shown in Fig. 3, guiding rollers 23 are journalled on said brackets coaxially with the pivots 25 on which said brackets are pivoted on the chains 2 and 3, and adapted at suitable times to engage stationary guide rails 26. As shown the guide rails are channel sections, and act to retain the brackets such as 6 and 7 in substantially fixed positions.

Further details of construction are illustrated in Figs. 5 to 7. In Figs. 5 and 6 is seen a rotatable arm 4 drawn on enlarged scale to illustrate the manner of attachment of the flexible element 1a. As shown, the flexible element is looped around the cross rod 8 as at 27. The flexible element which may be of suitable plastic sheet is shown as being formed with spaced apertures 28 to reduce its weight. The same figures show that the pivot 10 for the rotatable arm has a sleeve 29 of flexible and/or resilient material interposed between it and the bracket 6b. Further, a spring 30 is shown for urging the latching pawl 16 towards its latching position.

Fig. 6 likewise shows in greater detail that does Fig. 3, the construction of the part 19 securely fitted around the pivot 18 which interconnects the pair of cooperating pawls 16, as well as the sliding member 20 with its actuating projection 21 for actuating the pawls 16. In this construction, the part 19 is of short length and the sliders 20—21 are able to assume only three different settings, respectively indicated by the broken lines 31a, 31b and 31c. It will be understood however that any desired number of settings may readily be provided for the sliding selector member 20—21, e.g. five, six or more, whereby each individual carrier element may be selectively dumped at any of a corresponding number of unloading stations, levels or platforms.

Fig. 7 illustrates, part in elevation and part in section on a central plane the manner in which the brackets 7b—7c serve to support the rod 10 on which the rotatable arms are secured. As shown, a resilient sleeve or ring 29 is preferably provided. Various other components mentioned above are also clearly shown in this figure, including the pawl 16 and sleeve 19, and the follower roller 12 pivoted on the rotatable arm, not shown, and engaging the main camway and which roller is journalled on a pivot 32 secured in place by a nut and lock-nut arrangement.

Fig. 8 is a diagram illustrating in detail the movements involved in the dumping operation of a carrier element. The rotatable supporting arm of the element is shown at 8 and the flexible element at 1a, in solid lines, in the carrying condition of the element, wherein the flexible element forms a pocket, i.e. extends in such a way that an horizontal plane drawn through the lower or outer point of attachment A intersects the flexible element at another point further inward. It will be readily recognized that the curve defined by element 1a is the well-known catenary curve. The tangent thereto at point A is indicated at ST. In broken lines is shown the position 8′ assumed by arm 8 and the position 1b assumed by the flexible element in the dumping condition. The arm 8 has been rotated by an angle $q$ and it can be seen that the angle $q$ is considerably smaller than the angle $p$ between the lines ST and CA′ which represents the amount by which the element 1 has been rotated near its extremity A during the dumping operation. This clearly indicates that the mechanism of the invention achieves a substantial mechanical advantage.

It will be evident from the above detailed description that the improved conveyor or elevator apparatus with automatic selective dumping means according to the invention includes a number of outstanding advantages, including:

The carrier elements or buckets are of extreme simplicity, and low cost.

The carrier elements are lightweight thereby permitting further savings both on the supporting structure and the power requirements.

Great simplicity in the means for actuating and controlling the dumping operation of the carriers, as well as for selecting the dumping station.

The rotational movement of the supporting arm or arms of the carrier elements is of relatively small amplitude during the dumping operation while achieving a much larger amplitude of rotation of the free extremity of the carrier element (as previously explained); this feature makes it possible, in particular, to mount the rotatable pivot by means of a rubber or the like which is deformed in torsion without permanent deformation.

High accuracy is readily attainable in the dumping operations with the use of the simple means specified, so that the dumping of the contents can easily be effected in a gentle and yet thorough manner, upon an unloading platform or other receiver.

It will be obvious that the invention is not restricted to the particular uses and fields of application specifically mentioned nor are the constructional forms of it limited to those shown. Among the various modifications and variations conceivable, the following few may be more specifically mentioned:

The endless drive means may include one or more cables or belts rather than chains.

The flexible carrier element may be of other than rectangular form supported at its four corners, e.g. it may be triangularly supported at its three apices, for example at a single top apex fixed to the endless drive means and at its two spaced lower apices rotatable with respect to the drive means.

The movement of the rotatable arm may be controlled in a more positive manner by means of a special camway or the like, rather than being actuated by gravity into engagement with the camway as illustrated.

The latching and releasing functions may be reversed from the relationships described.

The movable supporting means (e.g. rotatable arms) of each carrier element, rather than being provided at the bottom of the element and being moved downwardly during movement from carrying to dumping position, may be provided at the top of the element and be displaced upwardly for movement from carrying to dumping position.

The endless drive chains or equivalent means may be other than two in number, e.g. one, or three or more.

What I claim is:

1. Conveyor apparatus comprising endless drive means displaceable along a path of travel, a plurality of supporting means mounted on and spaced along the drive means, a plurality of carrier members of flexible sheet material carried by the supporting means, the supporting means including means movably supporting at least one edge of each carrier member for movement between two positions in one of which the carrier member is slack to form a pocket and in the other of which it is relatively taut to dump material therefrom, and means adjacent said path operatively engageable with said supporting means to control movement thereof between said two positions in response to movement of the supporting means along the path.

2. Conveyor apparatus comprising endless drive means displaceable along a path of travel, a plurality of supporting means mounted on and spaced along the drive means, a plurality of carrier members of flexible sheet material carried by the supporting means, the supporting means including means movably supporting one edge of each carrier member fixedly on the drive means and the opposite edge for movement between two positions in one of which the carrier member is slack to form a pocket and in the other of which it is relatively taut to dump material therefrom, and means adjacent said path operatively engageable with said supporting means to control movement thereof between said two positions in response to movement of the supporting means along the path.

3. Apparatus as claimed in claim 1, wherein said carrier members are generally quadrangular and said supporting means for each carrier member comprises a pair of fixed members for fixedly securing two first transversely spaced points of said element to corresponding points of said endless means, and a pair of rotatable members having first ends pivoted to said endless means and other ends attached to further transversely spaced points of said element, whereby selective rotation of said rotatable members will move said further points of the element towards said first points to attain said first condition, and away from said first points to attain said second condition.

4. Apparatus as claimed in claim 2 wherein said control means comprises cam means disposed along said path, and follower means on each supporting means engageable with said cam means.

5. Apparatus as claimed in claim 2, comprising means biassing said supporting means to dumping position, said control means including cam means along said path normally urging said members to carrying position in opposition to the bias, of said biassing means and contoured at each at least some of said stations to allow said members to be moved to said dumping position by said biassing means.

6. In apparatus as claimed in claim 2, means normally maintaining said members in said carrying position, means at various points along said path for displacing said members to said dumping position, latching means on said drive means operatively engageable with each supporting means each supporting structure operable to prevent displacement of the related member to said dumping position by said displacing means, selective means for disabling said latching means to cause displacement of the member to dumping position, and presetting means on each supporting means pre-settable to any one of a plurality of settings for selecting a particular point at which said selective means will disable the latching means of said structure for dumping the related element.

References Cited in the file of this patent

UNITED STATES PATENTS

| | | |
|---|---|---|
| 278,050 | Ruddell | May 22, 1883 |
| 1,239,271 | Helfenbein | Sept. 4, 1917 |
| 1,608,840 | Davis | Nov. 30, 1926 |
| 2,828,002 | Sawrie | Mar. 25, 1958 |